United States Patent [19]
Kawaguchi

[11] Patent Number: 5,757,624
[45] Date of Patent: May 26, 1998

[54] DC-DC CONVERTER UNIT

[75] Inventor: Kenji Kawaguchi, Saitama, Japan

[73] Assignee: Honda Giken Kogyo Kabushiki Kaisha, Tokyo, Japan

[21] Appl. No.: 771,413

[22] Filed: Dec. 20, 1996

[30] Foreign Application Priority Data

Dec. 21, 1995 [JP] Japan ................................ 7-333551

[51] Int. Cl.$^6$ .................... H02J 1/00; H02B 1/04
[52] U.S. Cl. .................................. 363/15; 307/9.1
[58] Field of Search ........................ 123/45, 179.6; 307/9.1, 10.1; 363/20–21, 15

[56] References Cited

U.S. PATENT DOCUMENTS 4,386,278  5/1983  Kawada et al. ................. 307/9

FOREIGN PATENT DOCUMENTS 6-133401  5/1994  Japan .
7333551  12/1995  Japan .

*Primary Examiner*—Stuart N. Hecker
*Attorney, Agent, or Firm*—Birch, Stewart, Kolasch & Birch, LLP

[57] ABSTRACT

A DC—DC converter unit includes a high-voltage circuit having a main fuse provided in a case, a branch circuit branched from the high-voltage circuit on a downstream side of the main fuse, a subfuse inserted in the branch circuit, and a DC-DC converter connected to a terminal of the branch circuit. A main battery, mounted on an electric vehicle, is connected to a primary side of the high-voltage circuit. A high-voltage load is connected to a secondary side of the high-voltage circuit. The circuit of the high-voltage portion can be shortened, so that covered harnesses and waterproof connectors used in the high-voltage portion can be reduced to thereby reduce the cost. Further, the reliability of the high-voltage portion can also be improved.

18 Claims, 5 Drawing Sheets

DC-DC CONVERTER UNIT

BACKGROUND OF THE INVENTION

1. Field of the Invention

The present invention relates to a DC—DC converter unit for use in an electric vehicle.

2. Description of Background Art

An electric vehicle is conventionally known which is provided with a high-voltage system for driving the vehicle and a low-voltage system for converting a high voltage of the high-voltage system into a low voltage to drive lamps. See, Japanese Patent Laid-open Nos. Sho 47-30021 and Hei 6- 133401. In such a prior art electric vehicle, a DC—DC converter is provided to perform conversion from the high voltage to the low voltage.

FIG. 6 is a schematic view showing the connection of a conventional DC—DC converter. In an electric vehicle such as a two-wheeled, three-wheeled, or four-wheeled electric vehicle, an electric motor 103 is driven by a battery 101 in a power supply portion 100. In a system from the battery 101 to the electric motor 103, a main fuse 102 is interposed, and a subsystem is branched from this system on the downstream side of the main fuse 102. A subfuse 104 and a DC—DC converter 105 are interposed in this order in the subsystem. The high voltage from the battery 101 is converted into a low voltage by the DC—DC converter 105, and the low voltage is then supplied to lamps 106. In FIG. 6, the bold line arrows denote a high-voltage portion, the thin line arrows denote a low-voltage portion, and the solid circles denote a plurality of waterproof connectors 107.

The high-voltage portion in the circuit of the power supply portion 100 extends between the main battery 101 and the electric motor 103 and between the main fuse 102 and the DC—DC converter 105. Thus, the circuit of the high-voltage portion is long. Accordingly, it is necessary to cover harnesses, connectors, etc. with dedicated protective members. Further, it is necessary to use the waterproof connectors 107 in the high-voltage portion and to pay attention to the covering of harnesses in the high-voltage portion, causing an increase in the cost of parts.

SUMMARY AND OBJECTS OF THE INVENTION

It is accordingly an object of the present invention to provide a DC—DC converter unit which can reduce the number of parts in the high-voltage portion to reduce the cost, and can minimize the length of the circuit of the high-voltage portion to improve the reliability in a product vehicle, by integrating the main fuse and the DC—DC converter.

A DC—DC converter unit is provided which includes a high-voltage circuit having a main fuse provided in a case, a branch circuit branched from the high-voltage circuit on a downstream side of the main fuse, a subfuse inserted in the branch circuit, and a DC—DC converter connected to a terminal of the branch circuit. A main battery, mounted on an electric vehicle, is connected to a primary side of the high-voltage circuit, and a high-voltage load is connected to a secondary side of the high-voltage circuit.

With this configuration, the circuit of the high-voltage portion can be shortened, so that the covered harnesses and waterproof connectors to be used in the high-voltage portion can be reduced to thereby reduce the cost. Further, the reliability of the high-voltage portion can also be improved.

A fuse holding portion for the main fuse is covered with a small cover formed of an insulating material. Accordingly, contact with the high-voltage portion from the outside of the case can be prevented.

The connection between the DC—DC converter and the subfuse is made by a connecting bar mounted on the fuse holding portion by a fuse mounting screw. Accordingly, the connection can be made reliably and easily.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
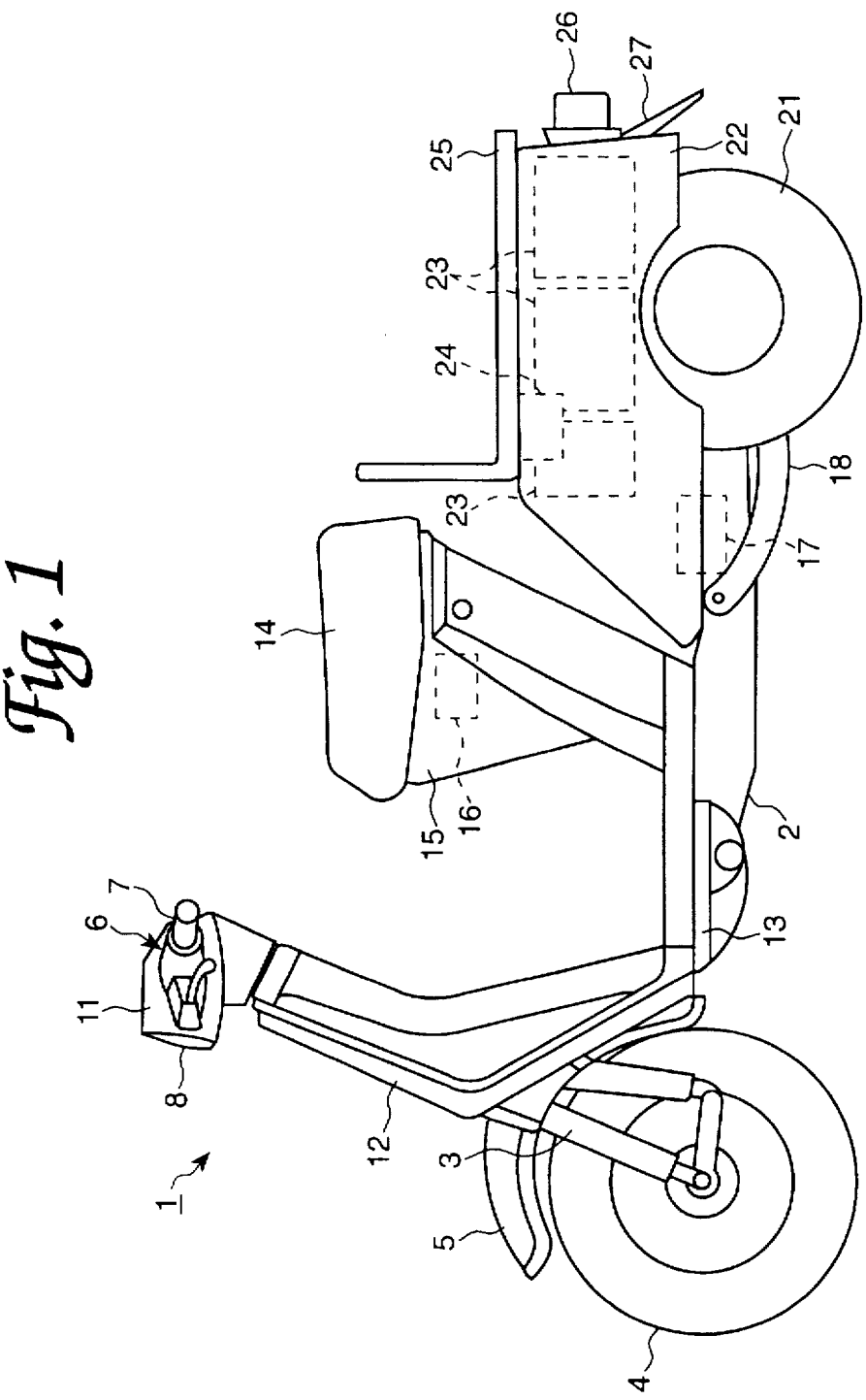
FIG. 1 is a side view of an electric three-wheeled vehicle on which a converter unit according to the present invention is mounted.

Some preferred embodiments of the present invention will now be described with reference to the attached drawings. Each drawing is to be viewed in the same direction as the directions of reference numerals shown therein.

FIG. 1 is a side view of an electric three-wheeled vehicle on which a DC—DC converter unit according to the present invention is mounted. An electric three-wheeled vehicle 1 includes a center frame 2, a steering head (not shown) mounted on a front portion of the center frame 2, a front fork 3 pivotably mounted on the steering head, a front wheel 4 rotatably mounted on the front fork 3, and a front fender 5 covering an upper portion of the front wheel 4. A steering handle 6 is mounted on an upper portion of the front fork 3. A pair of right and left grips 7 (the right one not being shown) are mounted on the steering handle 6. A headlight 8 is mounted on the steering handle 6. A handle cover 11 covers the steering handle 6 and the headlight 8 and incorporates a speedometer, a main battery level meter, etc. A front cover 12 covers the front portion of the center frame 2, a floor step 13 and a seat post (not shown) are provided on an upper portion of the center frame 2. A seat 14 is mounted on an upper portion of the seat post. A seat under cover 15 covers the seat post. A charger 16 is provided inside the seat under cover 15. An electric motor 17 is provided on the center frame 2 at a position behind the seat 14. A rear fork 18 extends rearwardly from the rear end of the center frame 2 and is vertically swingable. A pair of right and left rear wheels 21 (the right one not being shown) are mounted on the rear fork 18. A vehicle body cover 22 is provided above the rear wheels 21, a plurality of main batteries 23 and a DC—DC converter unit 24 (which will be hereinafter referred to as "converter unit 24") are accommodated inside the vehicle body cover 22. A carrier 25 is mounted on an upper portion of the vehicle body cover 22. A tail lamp 26 and a license plate 27 are mounted on a rear portion of the vehicle body cover 22.

Figure 2:
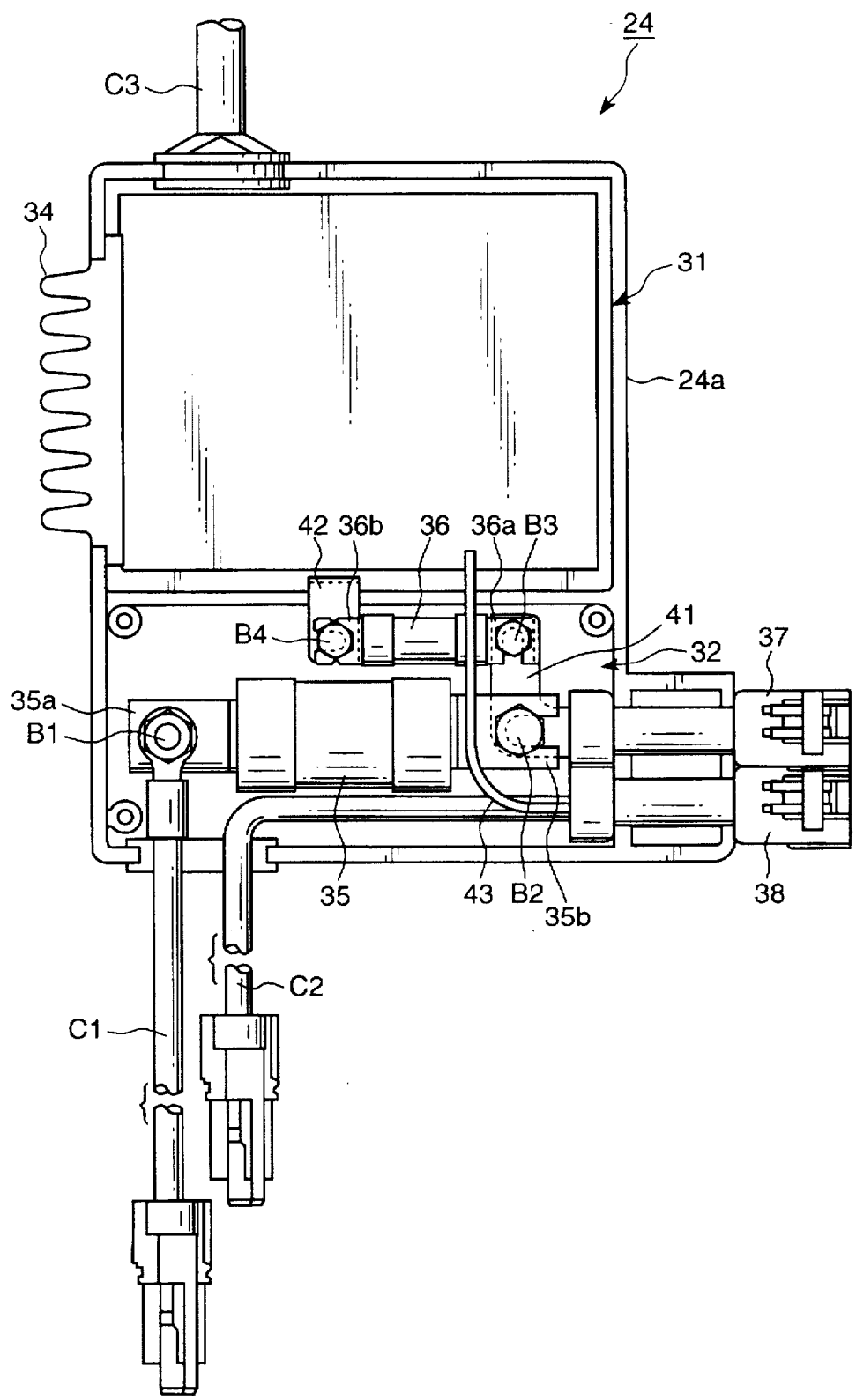
FIG. 2 is a plan view of the converter unit according to the present invention.

FIG. 2 is a plan view of a converter unit according to the present invention in the condition wherein an upper cover is removed.

The converter unit 24 is composed of a DC—DC converter portion 31 (which will be hereinafter referred to as "converter portion 31") occupying about a half of a case 24a, and a fuse storing portion 32.

The converter portion 31 is a device for converting a high voltage (e.g., 60 V) of a main battery power supply into a low voltage (e.g., 12 V). The converter portion 31 is provided with a fin 34 formed of aluminum, so as to radiate heat generated upon conversion of voltage. Further, the converter portion 31 is molded with resin or the like as a waterproofing means for preventing a short circuit or leak due to the application of water.

Figure 4A:
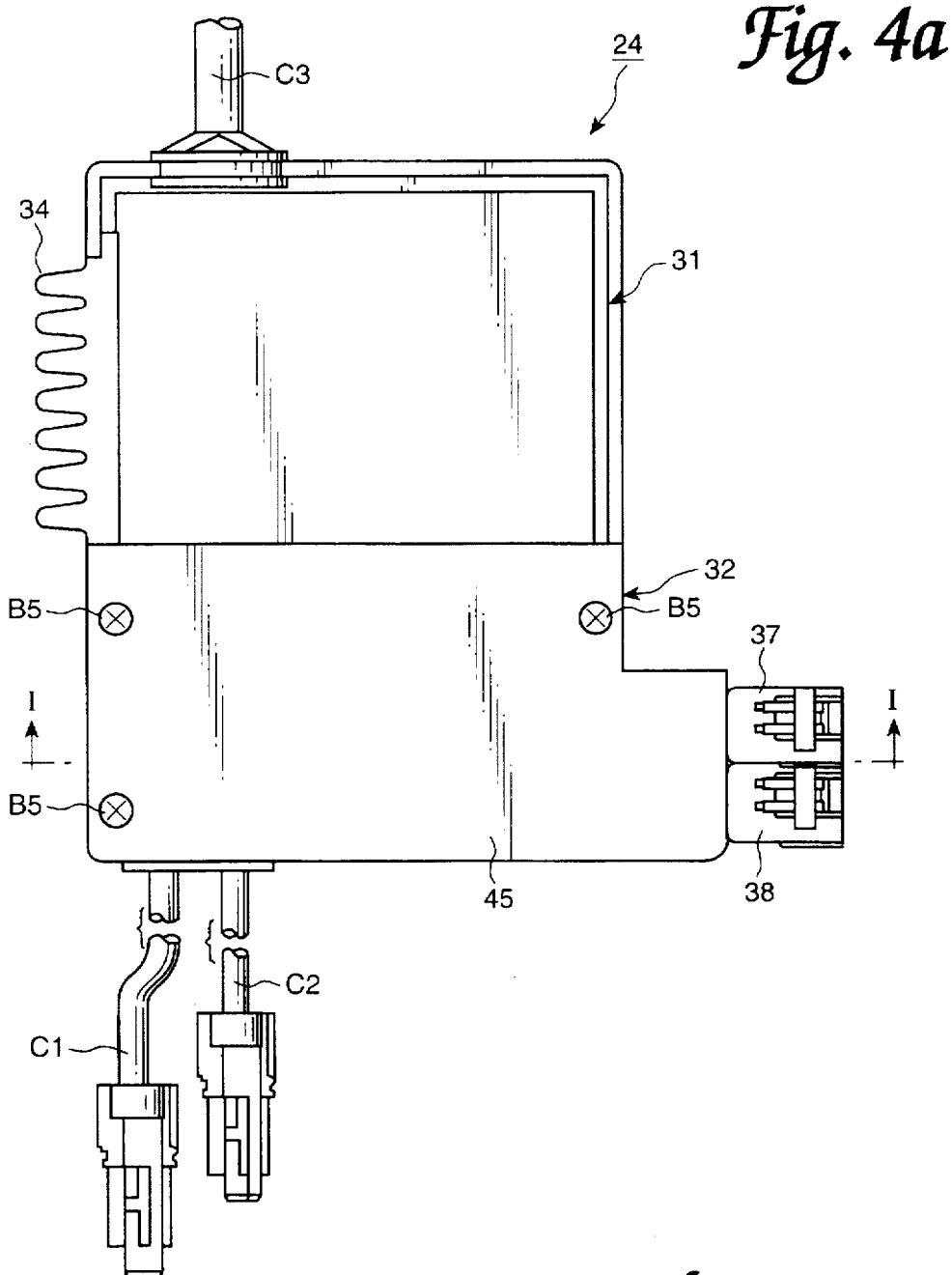
FIGS. 4(a) and 4(b) are views illustrating a small cover of the converter unit according to the present invention.
Figure 4B:
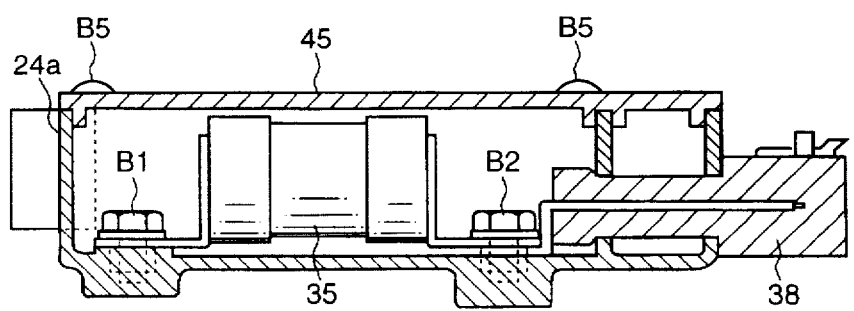

As illustrated in FIGS. 2, 4(a) and 4(b), the fuse storing portion 32 includes a main fuse 35 for the high voltage, a subfuse 36 for the low voltage, and waterproof connectors 37 and 38 for connecting harnesses connected to the electric motor 17.

The main fuse 35 has terminals 35a and 35b at opposite ends thereof. A harness C1 is connected to the main battery 23 and is mounted on the terminal 35a by a bolt B1. The waterproof connector 37 is mounted on the terminal 35b by a bolt B2.

The subfuse 36 has terminals 36a and 36b at opposite ends thereof. A connecting bar 41 is connected at one end thereof to the terminal 35b of the main fuse 35 and is connected at the other end to the terminal 36a by a bolt B3. A connecting bar 42 is connected at one end thereof to the converter portion 31 and is connected at the other end to the terminal 36b by a bolt B4. The connecting bars 41 and 42 are formed of copper plates, and have very small electric resistances. Another harness C2 from the main battery 23 is connected to the waterproof connector 38. A connecting bar 43 is connected to the converter portion 31 and extends from the waterproof connector 38. As illustrated in FIGS. 2, 4(a) and 4(b), C3 denotes a harness for connecting the converter portion 31 and lamps 44.

Figure 3:
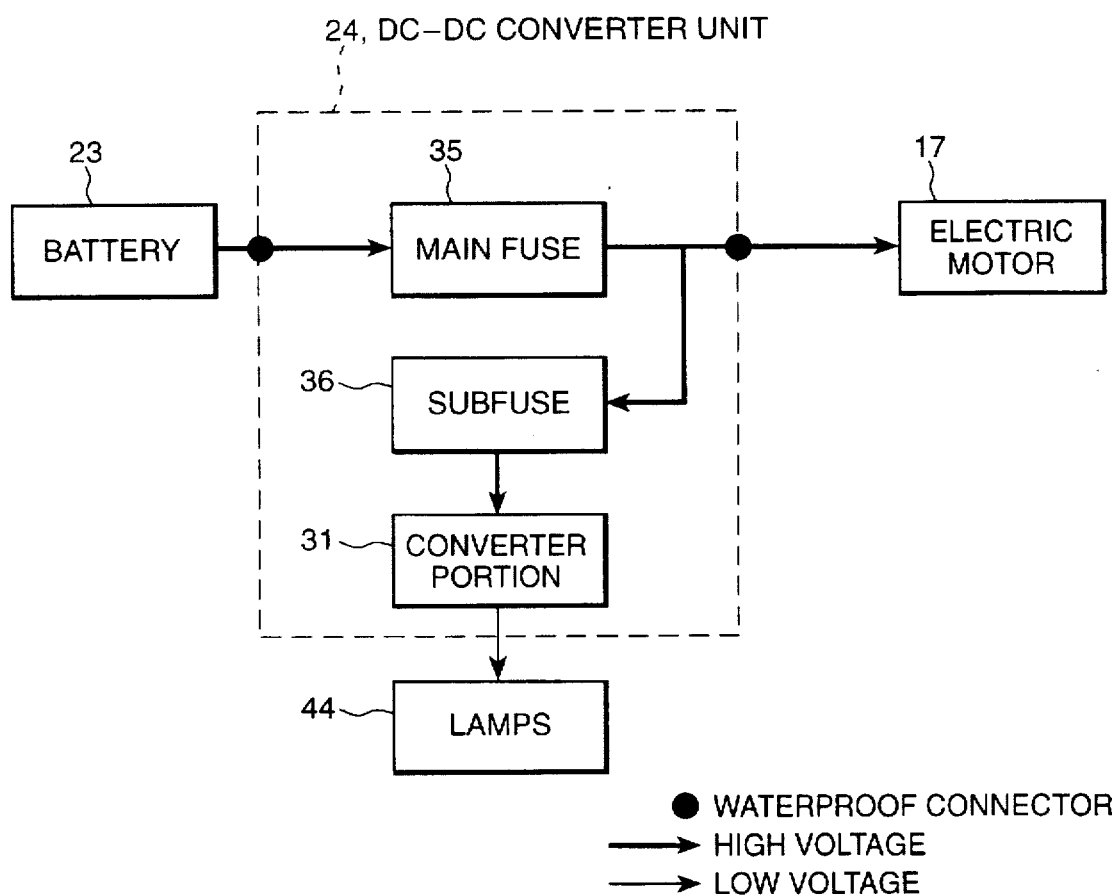
FIG. 3 is a schematic view showing the connection of the converter unit according to the present invention, a main battery, and an electric motor.

FIG. 3 is a schematic view showing the connection of the converter unit according to the present invention, the main battery, and the electric motor. In FIG. 3, the bold line arrows denote a high-voltage portion, the thin line arrows denote a low-voltage portion, and the solid circles denote waterproof connectors.

An electric current from the main battery 23 flows through the main fuse 35 to the electric motor 17, thereby driving the electric motor 17, this circuit will be hereinafter referred to as a first circuit K1.

In the converter unit 24, the electric current flows through the main fuse 35, the subfuse 36, and the converter portion 31 in this order to the lamps 44, this circuit will be hereinafter referred to as a second circuit K2.

The high-voltage portion is given by the first circuit K1 from the main battery 23 to the electric motor 17 and a portion of the second circuit K2 from the main fuse 35 to the converter portion 31. The low-voltage portion is given by the remaining portion of the second circuit K2 from the converter portion 31 to the lamps 44.

The high-voltage portion is exposed only between the main battery 23 and the converter unit 24 and between the converter unit 24 and the electric motor 17. Further, only two waterproof connectors are used at an input portion of the converter unit 24 from the main battery 23 and an output portion of the converter unit 24 to the electric motor 17.

FIGS. 4(a) and 4(b) illustrate a small cover of the converter unit according to the present invention, in which FIG. 4(a) is a plan view and FIG. 4(b) is a cross section taken along the line b—b in FIG. 4(a).

Referring to FIG. 4(a), the converter unit 24 has a small cover 45 formed of an insulating material, for covering the high-voltage portion in the fuse storing portion 32.

Referring to FIG. 4(b), the small cover 45 is mounted on the case 24a by screws B5. By mounting the small cover 45 on the case 24a, rain water or the like is prevented from entering the fuse storing portion 32. Thereby, a short circuit or leak is prevented. Further, there is no possibility that an operator may erroneously touch the high-voltage portion with his hands or the like or erroneously exchange other fuses in maintenance of the vehicle body. The small cover 45 may be replaced by a cover for covering both the fuse storing portion 32 and the converter portion 31.

Figure 5:
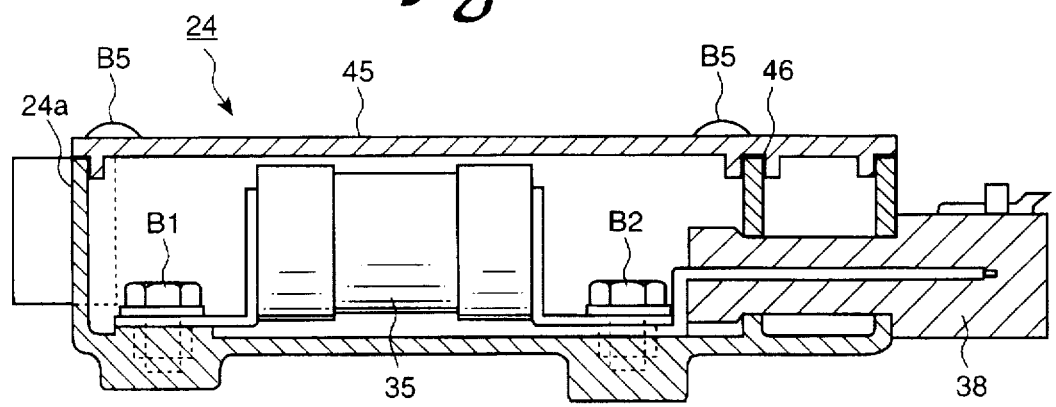
FIG. 5 is a sectional view showing a second preferred embodiment of the converter unit according to the present invention.
Figure 6:
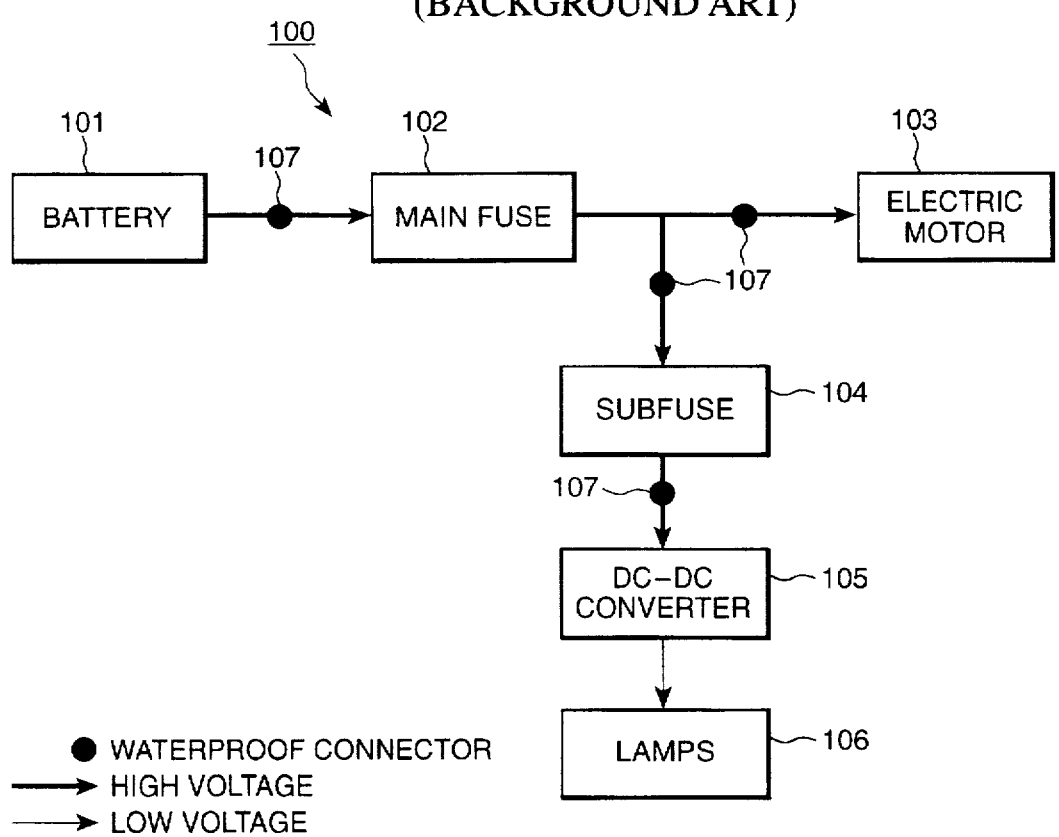
FIG. 6 is a schematic view showing the connection of a DC—DC converter of the prior art.

FIG. 5 is a sectional view showing a second preferred embodiment of the converter unit according to the present invention. The converter unit 24 in the second preferred embodiment has a waterproof seal 46 between the case 24a and the small cover 45. A waterproof arrangement can be obtained to improve the reliability of the prevention of a short circuit or leak. In the case wherein the small cover 45 is replaced by a cover for fully covering the case 24a, and the waterproof seal 46 is provided between this cover and the case 24a, the resin molding for the converter portion 31 as in the first preferred embodiment may be omitted.

The present invention exhibits the following effects owing to the above configuration.

The converter unit comprises a high-voltage circuit including a main fuse provided in a case, a branch circuit branched from the high-voltage circuit on a downstream side of the main fuse, a subfuse inserted in the branch circuit, and a DC—DC converter connected to a terminal of the branch circuit, wherein a main battery mounted on an electric vehicle is connected to a primary side of the high-voltage circuit, and a high-voltage load is connected to a secondary side of the high-voltage circuit. With this configuration, the circuit of the high-voltage portion can be shortened, so that covered harnesses and waterproof connectors to be used in the high-voltage portion can be reduced to thereby reduce the cost. Further, the reliability of the high-voltage portion can also be improved.

The converter unit includes a fuse holding portion for the main fuse which is covered with a small cover formed of an insulating material. Accordingly, contact with the high-voltage portion from the outside of the case can be prevented in carrying out maintenance of a vehicle body.

The converter unit includes a connection between the DC—DC converter and the subfuse which is made by a connecting bar mounted on the fuse holding portion by a fuse mounting screw. Accordingly, the connection can be made reliably and easily, thereby improving the reliability and reducing the man-hours for assembly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A DC—DC converter unit comprising:

a high-voltage circuit including a main fuse provided in a case;

a branch circuit branched from said high-voltage circuit on a downstream side of said main fuse;

a subfuse inserted in said branch circuit;

a DC—DC converter connected to a terminal of said branch circuit for supplying a low-voltage circuit;

a housing including a space defined within; and a fuse holding portion for holding said main fuse, said fuse holding portion including a cover formed of an insulating material for covering said fuse holding portion;

wherein said housing houses said DC—DC converter, said main fuse and said subfuse in said space defined within, and wherein a main battery mounted on an electric vehicle is connected to a primary side of said high-voltage circuit, and a high-voltage load is connected to a secondary side of said high-voltage circuit.

2. The DC—DC converter unit according to claim 1, wherein a connection between said DC—DC converter and said subfuse is made by a connecting bar mounted on said fuse holding portion by a fuse mounting screw.

3. A DC—DC converter unit comprising:

a housing including a space defined within and a cover for closing said space;

a high-voltage line being supplied through said space in said housing;

a main fuse operatively connected to said high-voltage line and said main fuse being disposed within said space of said housing;

a branch line being disposed within said space in said housing and being operatively connected to said high-voltage line;

a subfuse operatively connected to said branch line and said subfuse being disposed within said space of said housing; and a DC—DC converter being operatively connected to said branch line;

wherein a waterproof connection is provided for said high-voltage line at connections of the high-voltage line upon entering and exiting from the space of said housing and a cover is provided to seal said space from the environment.

4. The DC—DC converter unit according to claim 3, and further including a first terminal and a second terminal disposed wherein said space of said housing, said high-voltage line being connected to said first terminal and said second terminal with said main fuse being disposed therebetween.

5. The DC—DC converter unit according to claim 3, and further including a first connecting bar for connecting said high-voltage line to said branch line and a second connecting bar for connecting said branch line to said DC—DC converter.

6. The DC—DC converter unit according to claim 5, and further including a third terminal and a fourth terminal disposed wherein said space of said housing, said first connecting bar being connected to said third terminal and said second connecting bar being connected to said fourth terminal with said subfuse being disposed therebetween.

7. The DC—DC converter unit according to claim 3, and further including a connector for low-voltage application being supplied from said DC—DC converter.

8. The DC—DC converter unit according to claim 3, and further including a waterproof seal being disposed between said cover and said housing.

9. The DC—DC converter unit according to claim 3, wherein said cover is disposed over an area of said space within said housing where said main fuse and said subfuse are disposed.

10. The DC—DC converter unit according to claim 3, wherein said DC—DC converter is positioned within said space of said housing and said cover is disposed over the entire space of said housing where said main fuse, said subfuse and said DC—DC converter are disposed.

11. A DC—DC converter unit comprising:

a housing including a space defined within and a cover for closing said space;

a high-voltage line being supplied through one end of said space in said housing;

a main fuse operatively connected to said high-voltage line with said main fuse being disposed within said space of said housing;

a branch line being disposed within said space in said housing and being operatively connected to said high-voltage line;

a subfuse operatively connected to said branch line with said subfuse being disposed within said space of said housing; and a DC—DC converter being operatively connected to said branch line with said DC—DC converter being disposed within said space of said housing;

wherein a waterproof connection is provided for said high-voltage line at connections of the high-voltage line upon entering and exiting from the space of said housing and said cover is provided to seal said space from the environment.

12. The DC—DC converter unit according to claim 11, and further including a first terminal and a second terminal disposed wherein said space of said housing, said high-voltage line being connected to said first terminal and said second terminal with said main fuse being disposed therebetween.

13. The DC—DC converter unit according to claim 11, and further including a first connecting bar for connecting said high-voltage line to said branch line and a second connecting bar for connecting said branch line to said DC—DC converter.

14. The DC—DC converter unit according to claim 13, and further including a third terminal and a fourth terminal disposed wherein said space of said housing, said first connecting bar being connected to said third terminal and said second connecting bar being connected to said fourth terminal with said subfuse being disposed therebetween.

15. The DC—DC converter unit according to claim 11, and further including a connector for low-voltage application being supplied from said DC—DC converter.

16. The DC—DC converter unit according to claim 11, and further including a waterproof seal being disposed between said cover and said housing.

17. The DC—DC converter unit according to claim 11, wherein said cover is disposed over an area of said space within said housing where said main fuse and said subfuse are disposed.

18. The DC—DC converter unit according to claim 11, wherein said cover is disposed over the entire space within said housing where said main fuse, said subfuse and said DC—DC converter are disposed.

* * * * *

UNITED STATES PATENT AND TRADEMARK OFFICE
CERTIFICATE OF CORRRECTION

PATENT NO. : 5,757,624
DATED : May 26, 1998
INVENTOR(S) : Kenji Kawaguchi It is certified that error appears in the above-identified patent and that said Letters Patent is hereby corrected as shown below:

Title page, item [56] insert the following:

FOREIGN PATENT OR PUBLISHED FOREIGN PATENT APPLICATION

| | | DOCUMENT NUMBER | | | | | PUBLICATION DATE | COUNTRY OR PATENT OFFICE | CLASS | SUBCLASS | TRANSLATION YES | NO |
|---|---|---|---|---|---|---|---|---|---|---|---|---|
| | | 47 | 3 | 0 | 0 | 2 | 1 | 11/08/72 | Japan | | | | |
| | | | | | | | | | | | | | |

Signed and Sealed this

Sixteenth Day of March, 1999

Attest:

Q. TODD DICKINSON

*Attesting Officer*          *Acting Commissioner of Patents and Trademarks*